June 2, 1959  P. E. LIGHTY  2,889,500
SELENIUM RECTIFIER
Filed Dec. 15, 1954

INVENTOR
PAUL E. LIGHTY
BY Henry Kolin
AGENT

United States Patent Office 2,889,500
Patented June 2, 1959

2,889,500

SELENIUM RECTIFIER

Paul E. Lighty, Lafayette, N.J., assignor to International Telephone and Telegraph Corporation, Nutley, N.J., a corporation of Maryland Application December 15, 1954, Serial No. 475,450

7 Claims. (Cl. 317—241)

This invention relates to improvements in selenium rectifiers and more particularly to the introduction of a novel admixture to selenium for improving the rectification ratio of a selenium rectifier.

Pure selenium has a resistivity which is considered too high for use in making selenium rectifiers. To increase the conductivity of the selenium, many substances have been proposed for incorporation therein. However, it has been found that frequently the increase in conductivity of the selenium is obtained at the expense of the reverse resistance, which drops, thereby often resulting in a more unfavorable rectification ratio than untreated selenium. Thus, in the article entitled "Influence of Admixtures to Selenium on the Electrical Properties of Selenium Rectifiers" by N. A. Penim and K. V. Astakhov, which appeared in the "Journal of Technical Physics" (U.S.S.R.), volume 16, pages 199–206 (1946), a study was reported on the effect of admixtures of selenides of copper, silver, nickel, iron, zinc, cadmium, mercury, tin, lead, arsenic, antimony and bismuth to highly purified selenium. It was found that in all instances the rectification ratios of selenium rectifiers prepared from the treated selenium were poorer than those of rectifiers using pure selenium.

At present, halogens in various forms are commonly added to selenium for increasing its conductivity. However, the use of these halogens as admixtures to selenium has several drawbacks and represents, in essence, a compromise between obtaining an improvement in the forward conductivity of the rectifier at the expense of a deteriorated reverse or blocking voltage.

It is an object of the present invention to provide a selenium rectifier containing a novel selenium layer.

It is a further object to provide a selenium rectifier having a higher rectification ratio than those known heretofore.

It is still an additional object to provide a method for preparing such improved rectifiers.

It is a feature of this invention that mercuric selenide, together with a halogen, is incorporated in selenium for obtaining a semiconductive element for use in a selenium rectifier.

It is a more specific feature of this invention that mercuric selenide is added to a halogen-containing selenium in a concentration not exceeding 100 parts mercury per million parts selenium, by weight.

Figure 1:
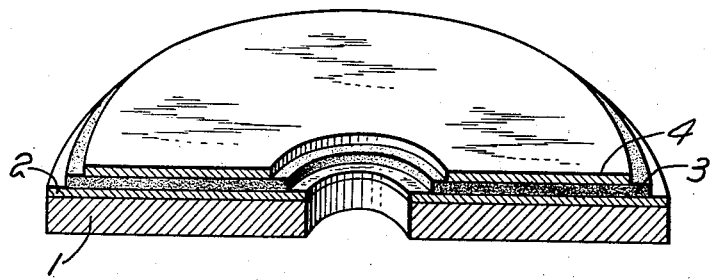
Figure 2:
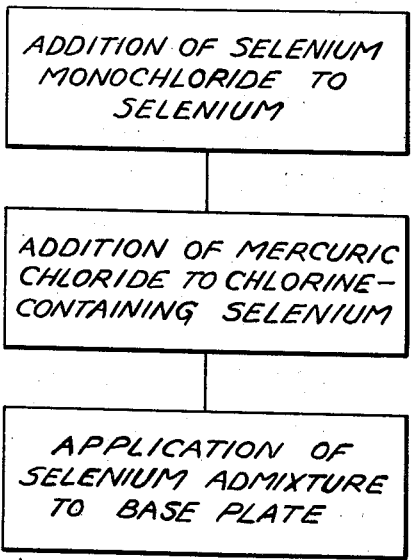

The above-mentioned and other features and objects of this invention will become more apparent by reference to the following description taken in conjunction with the accompanying drawing in which:

Fig. 1 represents a cross section of a rectifier showing an embodiment of this invention; and Fig. 2 represents a flow chart of the essential features of one embodiment of the process of this invention.

The preparation of selenium rectifiers has been described heretofore, for example, in the copending application of D. F. Allison, Serial No. 395,359 filed December 1, 1953, and the description contained therein may be considered for purposes of illustration as taken in conjunction with the description contained herein.

Referring to Fig. 1, the base plate element 1 may consist of any of the various metals used for this purpose such as iron, magnesium, aluminum, nickel or bismuth. Preferably, the base plate 1 consists of aluminum having a layer 2 of nickel thereon. The selenium layer 3 may be deposited upon the nickel-plated base by any of various methods, as described in Serial No. 395,359. The selenium contains a halogen, added in elemental or combined form, such as bromine, iodine, chlorine or mixtures thereof for purposes of increasing the conductivity of the selenium. Various amounts up to 500 parts halogen per million parts selenium by weight have been found suitable in this regard. In general, I prefer to add chlorine having a concentration between 100 and 200 parts chlorine, most specifically 140 parts chlorine per million parts by weight of selenium, and preferably added in the form of selenium monochloride. To this chlorine-containing selenium is then added mercuric selenide, which is uniformly dispersed throughout the selenium. The treated selenium is deposited on the base plate, preferably in the form of a fine powder. The selenium is then adhered to the base plate by pressing it thereon at a desired temperature, and the plate is further treated at an elevated temperature to crystallize the selenium and bring it to its conductive crystalline form. An optional insulating layer, either of genetic or non-genetic type, may then be formed or deposited on the selenium surface and a counter electrode 4 deposited thereon. The rectifier may then be electroformed in a customary manner. The novel electroforming process as set forth in Serial No. 395,359 may also be practiced with the subject invention.

It has been found that in adding mercuric selenide to a halogen-containing selenium, rectifiers may be obtained having almost a 100% improvement in rectification ratio. Various rectification ratios may be employed for purposes of comparing the performance of selenium rectifiers. For comparison, the ratio used herein has been obtained, for a fixed area of surface, by dividing the forward current at an applied voltage of 1.4 volts alternating-current by the reverse current leakage at a fixed power dissipation of 74 milliwatts per square centimeter. The improvement in rectification ratio obtained herein is a result of an increase both in the forward conductivity of the rectifier cell and in the reverse or blocking voltage of the cell. It has been found that the amount of mercuric selenide added is related to the amount of halogen present. Thus, for a concentration of 140 parts chlorine, added as selenium monochloride, per million parts selenium, it is desirable that the mercury concentration not exceed 100 parts mercury, added as mercuric selenide, per million parts selenium. The weights above specified are all calculated as weights based on the weight of pure selenium. A concentration between 15 and 50 parts mercury, most specifically 20 parts mercury, as mercuric selenide, per million parts selenium has been found particularly desirable for the practice of this invention. The addition of the mercuric selenide may be accomplished in any of several known manners, such as by adding mercuric selenide to selenium or melting the selenium and then cooling the mix and pulverizing the selenium. The mercuric selenide may be added to the selenium concurrently with addition of the halogen, before addition of the halogen or, preferably, as shown in Fig. 2, after the halogen has already been incorporated in the selenium.

While I have described above the principles of my invention in connection with specific materials and method steps, it is to be clearly understood that this description is made only by way of example and not as a limitation to the scope of my invention as set forth in the objects thereof and in the accompanying claims.

I claim:
1. A selenium rectifier comprising a base plate, a counter electrode adjacent said base plate, and a layer interposed between said base plate and counter electrode consisting of selenium containing admixtures of a halogen and mercuric selenide.

2. A selenium rectifier according to claim 1 wherein said halogen comprises chlorine.

3. A selenium rectifier comprising a base plate, a counter electrode adjacent said base plate, and a layer interposed between said base plate and counter electrode consisting of selenium containing admixtures of a halogen and mercuric selenide in which the mercuric selenide is present in said layer up to 100 parts of mercury per million parts of selenium by weight.

4. A selenium rectifier according to claim 3 wherein said halogen comprises chlorine.

5. A selenium rectifier comprising a base plate, a counter electrode adjacent said base plate, and a layer interposed between said base plate and counter electrode consisting of selenium containing admixtures of chlorine and mercuric selenide in which the chlorine is present in said layer between 100 and 200 parts chlorine per million parts selenium by weight and the mercuric selenide is present in said layer between 15 and 50 parts mercury per million parts selenium by weight.

6. A process of preparing a selenium rectifier having a base plate, a layer on said base plate and a counter electrode over said layer, comprising treating selenium by first dispersing selenium monochloride therein to obtain a ratio in the range of 100 to 200 parts by weight of chlorine to one million parts of selenium and then dispersing mercuric selenide in said chlorine-containing selenium to obtain a ratio in the range of 15 to 100 parts by weight of mercury to one million parts of selenium, depositing said treated selenium as a layer on said base plate, and depositing a counter electrode over said layer.

7. A process according to claim 6 wherein the mercuric selenide is present in an amount of 20 parts mercury per million parts selenium by weight.

References Cited in the file of this patent

UNITED STATES PATENTS

| | | |
|---|---|---|
| 2,081,771 | Rupp | May 25, 1937 |
| 2,361,156 | Thompson et al. | Oct. 24, 1944 |